UNITED STATES PATENT OFFICE.

TOR A. R. W. TORSEN, OF LYNN, MASSACHUSETTS, ASSIGNOR TO GENERAL ELECTRIC COMPANY, A CORPORATION OF NEW YORK.

REFRACTORY LINING.

1,167,135.  Specification of Letters Patent.  Patented Jan. 4, 1916.

No Drawing.  Application filed January 20, 1914.  Serial No. 813,319.

*To all whom it may concern:*

Be it known that I, TOR A. R. W. TORSEN, a citizen of the United States, residing at Lynn, county of Essex, State of Massachusetts, have invented certain new and useful Improvements in Refractory Linings, of which the following is a specification.

The present invention comprises a novel composition suitable for lining furnaces or similar devices where an inert highly refractory material is required.

It has been suggested to use carborundum for furnace linings with a clay binder but my experience has been that linings thus prepared are not durable.

I have discovered that the life of the lining can be greatly prolonged when silica is added to the mixture in a proper porportion to form a silicate which is slightly fusible at the temperature to which the lining is subjected. The effect of the incipient fusion of the silicate appears to be to seal over the surface of the lining and in general to fill the pores and interstices so that the effect of the heat and chemically active gases is confined to the surface layer.

In the preparation of the lining composition, I prefer to add a binder which enables the mass to be shaped, either in a suitable mold or form, or if desired, applied as a mortar or plaster. While silicon carbid may be used, other refractory compounds of silicon and carbon formed in the carborundum furnace, such as siloxicon, carborundum fire sand, and an amorphous impure carborundum may be used. In fact, my invention includes the use of any other highly refractory inert material in place of silicon compounds, for example, titanium carbid.

The following is a typical mixture illustrative of my invention and particularly applicable to brass melting furnaces: carborundum fire sand, 40-50 parts by weight; fire clay, 15-25 parts by weight; silica sand, 30-40 parts by weight; finely ground silica known as silica flour or mold wash, 3-8 parts by weight; molasses, or other sticky organic material, 1 part by weight; water, 1 part by weight.

The silica sand in part replaces the more expensive carborundum. The silica flour and in part the coarser sand combines with clay to form a fluxing silicate. The ingredients may be varied more or less but the above amount is entirely satisfactory. In some cases the sticky binder may be omitted.

When a greater proportion of silica is used the fusing point of the silicate formed by a chemical interaction of the clay and the silica is apt to be too low causing the lining to wear away by an actual fusion of the binding material. It is possible that the carbon residue from the binder also enters into the chemical reaction which consolidates the lining into a hard vitreous mass, but more probably the carbon is either burnt out or remains inert.

In some cases an easily fusible flux such as sodium chlorid may be added to advantage to the mixture and when the salt is used the amount of silica flour may be reduced, in fact the silica flour may be omitted.

The mixture is dried out and baked out in the usual manner, the lining being subjected to a slow fire first and gradually raised to a higher heat.

What I claim as new and desire to secure by Letters Patent of the United States, is:

1. A furnace lining composition comprising silica, clay and a refractory compound of silicon and carbon, the amount of said refractory compound by weight being substantially equal to the combined amount by weight of the silica and the clay.

2. A furnace lining composition comprising about 40 to 50 parts by weight of a refractory compound of silica and carbon, about 15 to 25 parts of fire clay, and about 33 to 48 parts of silica.

In witness whereof, I have hereunto set my hand this 17th day of January, 1914.

TOR A. R. W. TORSEN.

Witnesses:
JOHN A. MCMANUS, Jr.,
RALPH E. BARKER.